Figure 1:
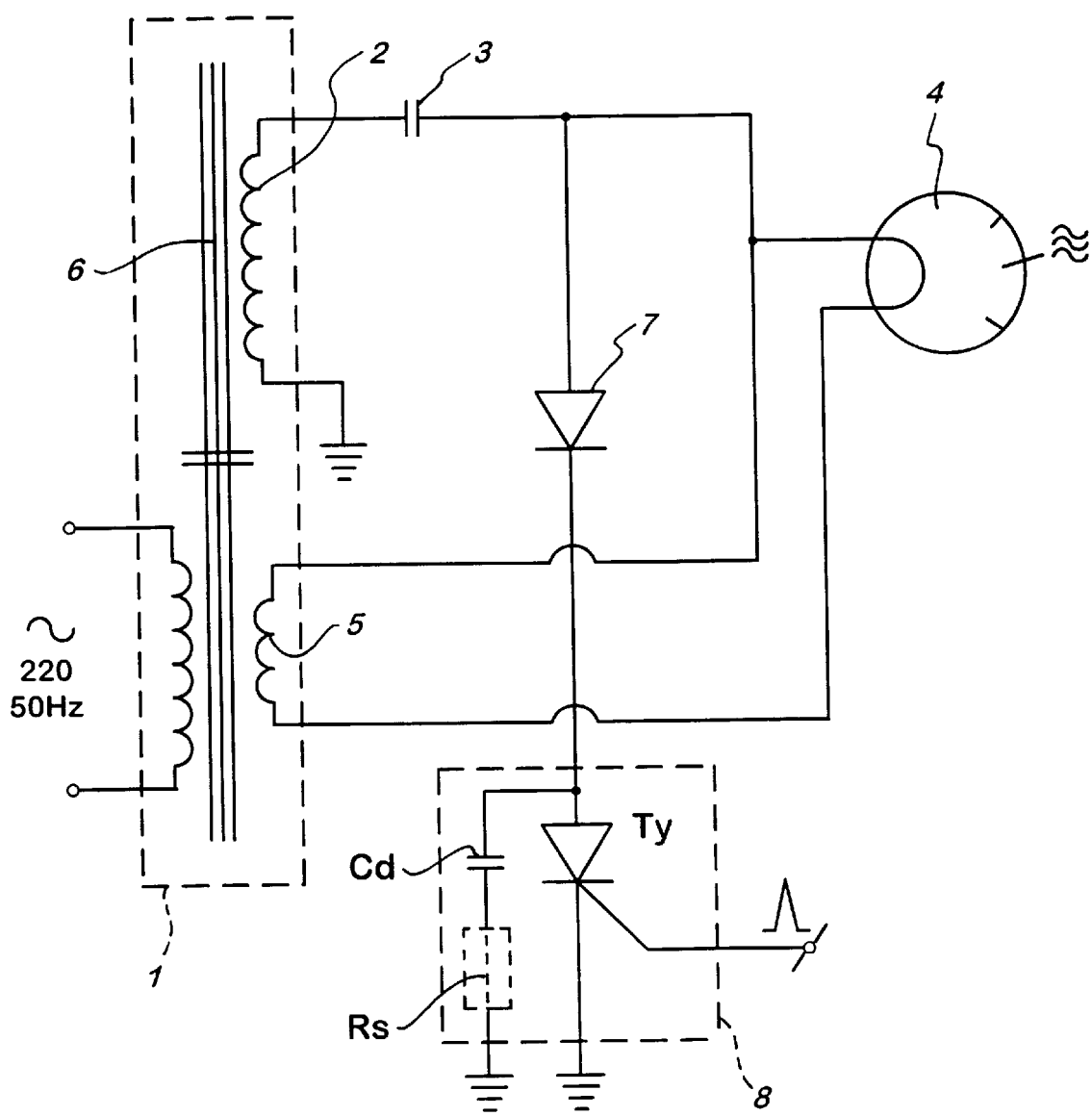

United States Patent
Parosa et al.

[11] Patent Number: 5,981,925
[45] Date of Patent: Nov. 9, 1999

[54] POWER SUPPLY FOR A CONTINUOUS WAVE MICROWAVE MAGNETRON

[76] Inventors: Ryszard Parosa, Pionierska Str. 22, 53213 Wroclaw, Poland; Edward Reszke, Rogowska Str. 146/5, 54-440 Wroclaw, Poland

[21] Appl. No.: 08/793,783

[22] PCT Filed: Sep. 5, 1995

[86] PCT No.: PCT/PL95/00019

§ 371 Date: Mar. 3, 1997

§ 102(e) Date: Mar. 3, 1997

[87] PCT Pub. No.: WO96/08121

PCT Pub. Date: Mar. 14, 1996

[30] Foreign Application Priority Data

Sep. 6, 1994 [PL] Poland ................................. P 304963

[51] Int. Cl.⁶ .................................................. H05B 6/66
[52] U.S. Cl. .......................................... 219/715; 363/128
[58] Field of Search .................... 219/702–721; 363/128, 135

[56] References Cited

U.S. PATENT DOCUMENTS

| | | | |
|---|---|---|---|
| 3,794,908 | 2/1974 | Lindblom et al. | 321/27 R |
| 4,717,861 | 1/1988 | Yuasa et al. | 315/241 P |
| 4,835,353 | 5/1989 | Smith et al. | 219/10.55 B |
| 4,949,233 | 8/1990 | Braunisch et al. | 363/28 |
| 5,661,394 | 8/1997 | Nakao et al. | 323/222 |

*Primary Examiner*—Teresa Walberg
*Assistant Examiner*—Jeffrey Pwu
*Attorney, Agent, or Firm*—St. Onge Steward Johnston & Reens LLC

[57] ABSTRACT

A power supply for a CW magnetron, devoted for use in microwave heating equipment. A power supply according to the present invention (FIG. 1) has a high-voltage line transformer (1) with secondary winding (2) which is connected through a voltage doubling rectifier circuit to the magnetron cathode (4). The voltage-doubling rectifier circuit comprises a high-voltage diode (7) and a capacitor (3). The distinctive feature of the present invention is that the diode (7) of voltage doubler is connected in-series with the at least one thyristor-capacitor network (8) which is composed of a high-voltage thyristor which has its anode and cathode connected together with an additional capacitor (Cd) or with series connection of said capacitor with a resistor (Rs).

14 Claims, 2 Drawing Sheets

POWER SUPPLY FOR A CONTINUOUS WAVE MICROWAVE MAGNETRON

The subject of this invention is a power supply for a CW magnetron and it is devoted for applications in cases where a precise control and stabilisation of microwave power level is required, partcularly in constructions of professional microwave power equipment. The power supply according to the present invention also be applied in construction of microwave ovens while it is simple and cheap in manufacturing.

The well known and widely used power supply for CW magnetrons has a form of ferroresonant current stabiliser with high voltage Villard-type doubler. This kind of power supply is characterised by the high reliability, high energy efficiency and simplicity which implies low costs of manufacturing what, in turn, resulted in its common employment in microwave ovens. Variations in this kind of circuits are also known e.g. from U.S. Pat. No. 3,873,883.

The disadvantage of the known and used typical power supplies is, that when connected to the AC line they can deliver power at single rated levels and adjustment of the average power is realised by switching the AC voltage at the primary winding of high voltage transformer on and off (the so-called duty cycle control, pulsating). The high voltage transformer is normally used for simultaneously energising of the filament circuit, therefore the switching of the primary voltage causes the so-called cold starts of the magnetron and this phenomenon implies limitation of the shortest allowable on/off cycle duration, which practically can not be shorter than a few seconds. This degrades both the continuity and the precision of power control. Moreover, the on/off timing is always accompanied with the current and voltage transients caused by the high inductance of the transformer.

The application of the triacs as switching elements at the transformer primary is limited to the group control (on/off switching), that is because traces of the DC current components which usually occur when the phase-type triac control is used may lead to the severe saturation of the transformer core.

The use of silicone controlled rectifiers in the Villard-type doubler circuits is known from technical literature of the late 60's. Different aspects of the gate firing of triacs or thyristors in magnetron power supplies along with current sensing circuitry have been given in U.S. Pat. Nos. 4,001, 537 and 4,012,617. In both the mentioned patents triacs or thyristors or different equivalents of those are supposed as phase -or group-type controllers of the Villard's doubler output voltage. Series connections of diode and triac or diode and thyristor are shown as possible thyristor quivalents but no means have been provided or discussed on how to facilitate the switching-on of the thyristor in such a high voltage circuit comprising a very high stray inductance of the transformer secondary winding. Moreover application of the mentioned patents would require the use of special transformer with taps at the secondary side or it would require isolation of the magnetron anode block to implement anode current sensing. Anyhow, the proposed circuits can not fulfill the role of a reliable power controller for the magnetron and a power supply built according to the claims and descriptions given therein does not bring solution of a wide range magnetron power adjustment and regulation. These limitations and shortcommings find their confirmation in the fact that after almost 20 years that passed between filing of this application and the dates of filing the above mentioned U.S. Patents nobody has used them to realize a really full range continuously adjustable and well regulated magnetron power controller. The improvement can ether not be expected from implementation of yet another U.S. Pat. No. 3,794,908 in which a high voltage device has been proposed in a form of stack of regulate low voltage thyristors equipped with dynamic RC voltage divider, however, used rather for monitoring of faults than for enhancement of switching with inductive loads.

Power supply for a magnetron according to the present invention has such a distinctive feature that in series with the diode in the voltage doubler it comprises at least one thyristor-capacitor network created by a high-voltage thyristor whose anode and cathode are connected together through an additional capacitor or through a series connection of that capacitor and a resistor. Additional capacitor is not an element of a snubber because no transients can be expected when there is a diode connected in series. Both the diode and additional capacitor form a single pulse rectifier which changes the role thyristor switch as now it becomes a DC switch drawing its conduction current first from additional capacitor and next from the circuit comprising the transformer secondary winding.

In the present invention the thyristor-capacitor network together with the diode play the role of controllable element in voltage doubler which enables both the group or the phase control of the power at the secondary, well from the AC mains isolated side of the transformer. Therefore, the transformer can instantly be connected to the mains and all the microwave power on/off controls may be provided as group-type control at elevated frequencies without noticeable current transients at the primary side. The present invention also enables a precise phase-type control in the magnetron current stabilisation feedback loop featuring also possible modulation of the power with different timeshapes. Further advantage of the present invention is that it can be realised with the use of typical elements such as transformer, voltage doubler capacitor and high voltage diode that are available as replacement parts for microwave ovens.

The subject of the present invention is shown in FIG. 1 which shows a schematic circuit diagram of one embodiment in which the thyristor-capacitor network represented by a single thyristor jumpered with a single capacitor.

Figure 2:
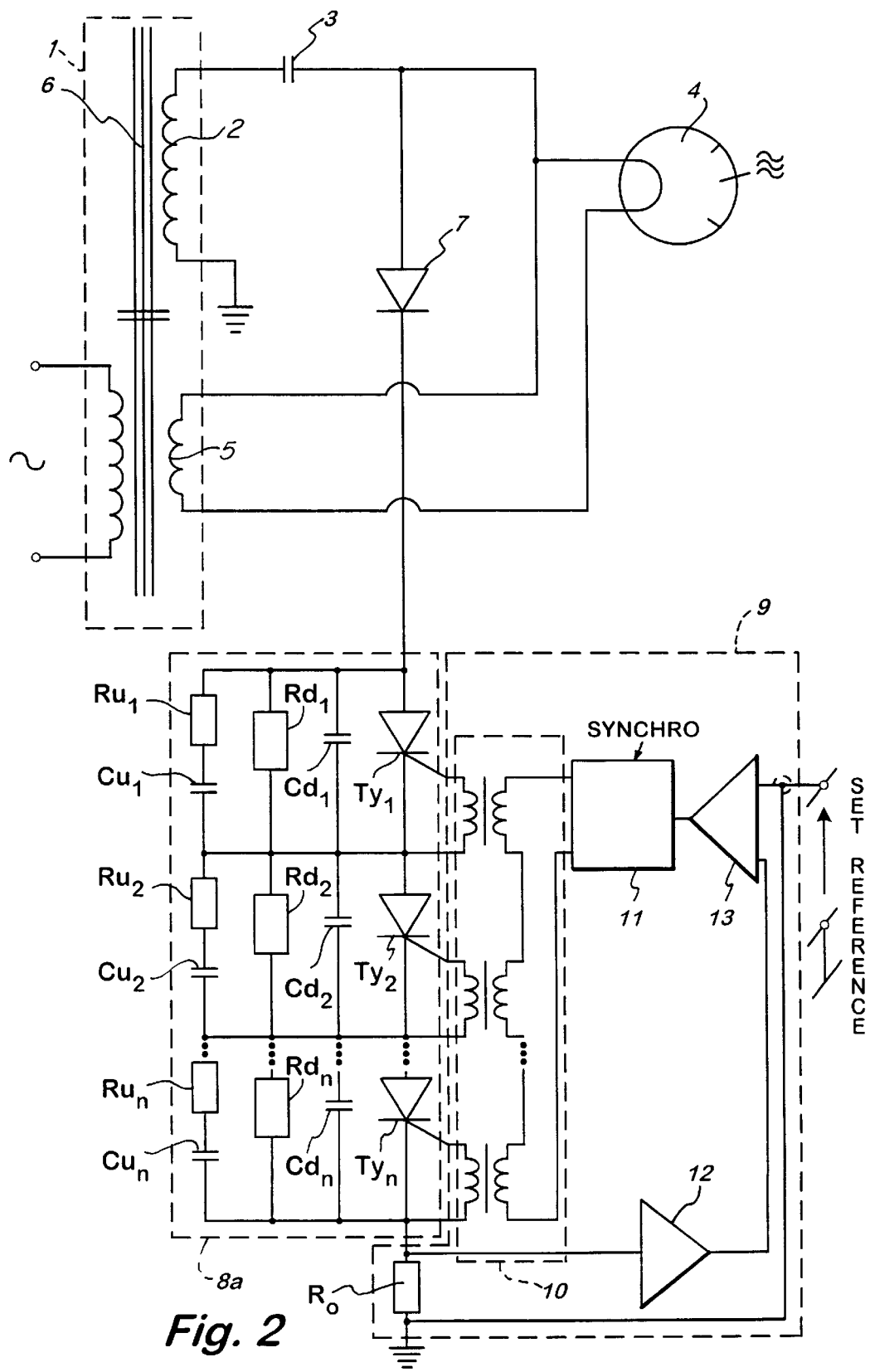

FIG. 2 is a circuit diagram of another embodiment in which the thyristor-capacitor network comprises at least two series-connections of to separate thyristors, each of those jumpered with an accompanying parallel capacitor.

According to the present invention a power supply for a continuous wave magnetron has a transformer 1, the secondary winding 2 of the transformer 1 is connected through the capacitor to the cathode 4 of the magnetron having its filament energised from winding 5 wound round the core 6 of the transformer 1. The high voltage diode 7 has its anode connected to the common point of the connections between the capacitor 3 and cathode 4 of the magnetron, while the cathode of diode 7 is connected to the common ground of the whole circuit by means of the thyristor-capacitor network 8 consisting of thyristor Ty with its cathode and anode connected together with an additional capacitor Cd which insures an initial current of thyristor Ty at the moment of firing. Additional capacitor Cd is charged via the high voltage diode 7. High-voltage diode 7 along with the thyristor-capacitor network 8 and with capacitor 3, all together form a controllable voltage doubler.

In the second embodiment shown in FIG. 2 the thyristor-capacitor network 8 is accomplished by series connections of at least two thyristors Ty1-Tyn fired simultaneously by the control circuit 9. In this embodiment the thyristors Ty1-Tyn are fired by means of the separation circuit 10 comprising gate transformers Tbl-Tbn with their pies connected in series and energised from a pulse-forming circuit 11 which acts in the closed feedback loop stabiliser consisting of current-sensing resistor Ro integrator 12, and differential amplifier 13. The one side if the sensing resistor Ro is connected to the thyristor Tyn and its other side is connected to the common ground of the whole circuit. Each thyristor Tyl-Tyn is jumpered by a respective additional capacitor Cdl-Cdn, respective resistor Rdl-Rdn and a respective series snubber RulCul-RunCun. The elements Rdl-Rdn, Rul-Run, Cul-Cun enhance the dynamics and reliability of the power controller. By changing the set reference voltage one can obtain different power settings from zero level up to the rated value which depends on the set of the base components, namely the transformer 1 and capacitor 3 that comes into resonance in the near of line frequency with a stray inductance of the secondary, high voltage winding 2 In the practice a continuous adjustment of power has been achieved in the range of 10–600 W with stability better than 5% at line variations from 190 to 250 V AC.

The operation of the power supply according to the present invention is the following: After switching on the mains to the primary winding of transformer 1 the positive half-waves from the secondary winding 2 charge the capacitor Cd via the diode 7 and through the capacitor 3. After firing gain of the thyristor Ty the capacitor Cd discharge through the thyristor and thus providing current necessary to start the thyristor to conduct and than maintain its conduction in the circuit consisting of the secondary winding 2 of the transformer 1, the capacitor 3, and the diode 7. The current flows as long as the capacitor 3 is fully charged. The level of the capacitor 3 charging depends on firing angle. During the negative half waves across the secondary winding 2 the diode 7 is blocked and the voltage of the winding 2 adds to the voltage of the capacitor 3 and the sum of both voltages is sent to the magnetron cathode 4. At the design dedicated for very high powers the capacitor(s) Cd should be connected in series with additional resistor(s) Rs which must limit starting currents of the thyristor(s) Ty below the level allowable by the manufacturer. Instead of the thyristors Ty, Tyl-Tyn one can with the same result apply opto-thyristors. It is also obvious that a power supply claimed in this disclosure can be accomplished in a multi-plicated form leading to a full-wave voltage multiplying rectifier circuit with the help of one or two transformers however, in such cases the cathode of magnetron must be connected with voltage multipliers with the use of additional separation diode.

What is claimed is:

1. A power supply for a continuous-wave magnetron, said supply comprising a line transformer, which has its secondary, anode winding connected through a voltage doubler to the cathode of said magnetron, with said voltage doubler having a diode (7) and having the distinctive feature that in series with the diode (7) of the voltage doubler there is connected at least one thyristor-capacitor network (8) composed of a high voltage thyristor (Ty) having a cathode and an anode which are connected together by means of additional capacitor (Cd) connected in parallel with the thyristor so as to be charged via the diode (7).

2. A power supply as set forth in claim 1 wherein the anode of said thyrister (Ty) is connected with its cathode by means of a series connection of said additional capacitor in series with a resistor (Rs).

3. A power supply for a continuous-wave magnetron wherein a line transformer, having a secondary winding, has said secondary winding coupled through a voltage doubler, including a rectifier element, to the cathode of the magnetron, comprising:

a controllable switch network formed of a semiconductor switch formed of a thyristor and a capacitor coupled in parallel with the thyristor; and with the switch network connected in series with the rectifier element across said secondary winding so that said capacitor can be charged by the rectifier element to provide a starting current derived from the secondary winding for the parallel connected thyristor.

4. The power supply as claimed in claim 3 wherein said semiconductor switch is formed of an opto-thyristor.

5. The power supply as claimed in claim 3 wherein said capacitor is connected in series with a resistor.

6. The power supply as claimed in claim 3 wherein said rectifier element is a diode.

7. The power supply as claimed in claim 3 wherein said controllable switch network comprises a plurality of series coupled semiconductor switches and a plurality of capacitor networks respectively coupled in parallel with the semiconductor switches.

8. A power supply for a continuous-wave magnetron wherein a line transformer, having a secondary winding, has said secondary winding coupled through a voltage doubler, including a rectifier element, to the cathode of the magnetron, comprising:

a plurality of series coupled controllable switch networks, each being formed with a thyristor switch and a capacitor network coupled in parallel with the thyristor switch; and with the switch networks connected in series with the rectifier element wherein said capacitor networks each include a capacitor and a series connected current limiting resistor.

9. The power supply as claimed in claim 8 and further including second capacitor networks each being formed with a resistor and a parallel connected capacitor, said second capacitor networks being coupled in parallel with respective series coupled semiconductor switches.

10. A power supply for a continuous-wave magnetron wherein a line transformer, having a secondary winding, has said secondary winding coupled through a voltage doubler, including a rectifier element, to the cathode of the magnetron, comprising:

a plurality of series coupled controllable switch networks, each being formed with a thyristor switch and a capacitor network coupled in parallel with the thyristor switch; and with the switch networks connected in series with the rectifier element;

and further including: a control circuit coupled to control the thyristor switches, said drive circuit being so connected to said thyristor switches so as to open and close them effectively simultaneously.

11. The power supply as claimed in claim 10 wherein said control circuit includes a transformer having a plurality of secondary windings respectively coupled to actuate the semiconductor switches and having a plurality of series connected primary windings for said effectively simultaneous opening and closing of the semiconductor switches.

12. The power supply as claimed in claim 11 wherein said semiconductor switches comprise thyristors.

13. The power supply as claimed in claim 11 wherein said semiconductor switches comprises opto-thyristors.

14. The power supply as claimed in claim 11 wherein said control circuit includes a current sensing element coupled in series with said semiconductor switches and connected between said latter switches and a common ground terminal.

* * * * *